United States Patent
Pellegrin et al.

[11] Patent Number: 5,900,206
[45] Date of Patent: May 4, 1999

[54] METHOD OF MAKING A FIBROUS PACK

[75] Inventors: Michael T. Pellegrin; James E. Loftus, both of Newark; Qingyu Zeng, Columbus, all of Ohio

[73] Assignee: Owens Corning Fiberglas Technology, Inc., Summit, Ill.

[21] Appl. No.: 08/977,405

[22] Filed: Nov. 24, 1997

[51] Int. Cl.⁶ .............................. C03B 37/04; D01D 5/00
[52] U.S. Cl. .............................. 264/555; 65/442; 65/455; 65/460; 65/517; 65/522; 264/211.1; 264/211.11; 425/72.2; 425/464
[58] Field of Search .................................. 264/6, 8, 103, 264/115, 121, 122, 211.1, 211.11, 555; 425/8, 72.2, 464; 65/442, 455, 460, 517, 522

[56] References Cited

U.S. PATENT DOCUMENTS

| | | |
|---|---|---|
| 2,083,132 | 10/1937 | Williams et al. . |
| 4,058,386 | 11/1977 | Faulkner et al. . |
| 4,568,581 | 2/1986 | Peoples, Jr. . |
| 4,751,134 | 6/1988 | Chenoweth et al. . |
| 4,777,086 | 10/1988 | Madden et al. . |
| 4,888,235 | 12/1989 | Chenoweth et al. . |
| 4,917,715 | 4/1990 | Kaveh et al. . |
| 5,123,949 | 6/1992 | Thiessen et al. . |
| 5,232,638 | 8/1993 | Thiessen et al. . |
| 5,236,754 | 8/1993 | McBride et al. . |
| 5,242,633 | 9/1993 | Rook et al. . |
| 5,277,955 | 1/1994 | Schelhorn et al. . |
| 5,326,241 | 7/1994 | Rook et al. . |
| 5,362,539 | 11/1994 | Hall et al. . |
| 5,437,922 | 8/1995 | Jackson et al. . |
| 5,458,822 | 10/1995 | Bakhshi et al. . |
| 5,458,960 | 10/1995 | Nieminen et al. . |
| 5,480,466 | 1/1996 | Jackson et al. . |
| 5,490,961 | 2/1996 | Bakhshi et al. . |
| 5,501,872 | 3/1996 | Allen et al. . |
| 5,523,031 | 6/1996 | Ault et al. . |
| 5,523,032 | 6/1996 | Ault et al. . |
| 5,545,279 | 8/1996 | Hall et al. . |
| 5,595,584 | 1/1997 | Loftus et al. . |
| 5,614,132 | 3/1997 | Bakhshi et al. . |
| 5,642,601 | 7/1997 | Thompson, Jr. et al. . |
| 5,679,126 | 10/1997 | Loftus et al. . |

FOREIGN PATENT DOCUMENTS

WO95/30787  11/1995  WIPO .

*Primary Examiner*—Leo B. Tentoni
*Attorney, Agent, or Firm*—C. Michael Gegenheimer; Curtis B. Brueske

[57] ABSTRACT

A method of making a fibrous pack includes centrifuging at least two sets of mineral fibers from molten mineral material using at least two rotary mineral fiber spinners that are arranged in a machine direction along a collection surface, directing each set of the mineral fibers into a downwardly moving veil beneath one of the mineral fiber spinners, generating a downwardly moving array of aligned organic fibers from at least one orificed die that is spaced apart from each of the mineral fiber spinners and directing the array into contact with the mineral fibers, and collecting the mineral fibers and organic fibers as a fibrous pack.

There is also provided apparatus for making a fibrous pack including at least two mineral fiber spinners that are arranged in a machine direction along a collection surface for centrifuging at least two sets of mineral fibers from molten mineral material, means for directing each set of mineral fibers into a downwardly moving veil beneath one of the mineral fiber spinners, at least one orificed die that is spaced from each of the mineral fiber spinners for generating a downwardly moving array of aligned organic fibers and directing the array into contact with the mineral fibers, and a collection surface for collecting the mineral fibers and organic fibers as a fibrous pack.

22 Claims, 3 Drawing Sheets

METHOD OF MAKING A FIBROUS PACK

The present application is related to the inventions of the following U.S. patent applications Ser. No. 08/976,671, entitled FIBROUS INSULATION HAVING INTEGRATED MINERAL FIBERS AND ORGANIC FIBERS, AND BUILDING STRUCTURES INSULATED WITH SUCH FIBROUS INSULATION, filed Nov. 24, 1998, [on even date herewith], and hereby incorporated by reference; Ser. No. 08/977,361, entitled A METHOD OF FORMING A PACK OF ORGANIC AND MINERAL FIBERS, filed Nov. 24, 1998 [on even date herewith],and hereby incorporated by reference; and Ser. No. 08/976,668, entitled METHOD AND APPARATUS FOR INTEGRATING ORGANIC FIBERS WITH MINERAL FIBERS, filed Nov. 24, 1998 [on even date herewith], and hereby incorporated by reference.

TECHNICAL FIELD AND INDUSTRIAL APPLICABILITY OF THE INVENTION

This invention relates to the manufacture of fibrous products for such uses as thermal and acoustical insulation and as structural molding media. More particularly, this invention relates to processes for manufacturing fibrous products having both mineral fibers and organic fibers, such as polymer fibers, with the different fibers being integrated with each other for beneficial product properties.

BACKGROUND OF THE INVENTION

Mineral fiber products, particularly products made of glass fibers, are typically made as either continuous fibers or discontinuous fibers. Various organic coatings can be applied to these fibers for protecting the fibers from abrasion, for connecting the mineral fibers to each other to form a structural product, and for providing compatibility of the mineral fibers with other materials, such as the compatibility between the reinforcement fiber and a plastic matrix. In the case of insulation products, the mineral fibers are usually bonded together by organic material, such as a phenol/formaldehyde binder, to form a spring-like matrix which can recover after compression during packaging. One mat product having both glass fibers and fibers of organic material, and manufactured by a textile non-woven process, is disclosed in U.S. Pat. No. 4,751,134 to Chenoweth et al.

The application of organic material to the mineral fibers can take several forms. Continuous mineral fibers can be run through a bath or across a coater to apply a coating to the fibers, such as during the application of a size to continuous fibers. Alternatively, the organic material can be sprayed onto the mineral fibers. This method is commonly used in the manufacture of insulation products with a rotary process where a cylindrical veil of mineral fibers is met with the sprays of the phenol/formaldehyde binder.

One of the problems with applying aqueous organic binders of the prior art to cylindrical veils of mineral fibers is that a portion of the binder tends to evaporate prior to contact between the liquid binder drop and a mineral fiber in the veil. This problem is exacerbated by the need to apply the binder relatively close to the fiberizer, i.e., where the hot environment is particularly likely to cause some of the liquid binder droplets to evaporate before contacting a glass fiber. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect. Further, the binder material must be cured in an oven, requiring tremendous energy not only for curing the binder itself, but also for driving off the water associated with the binder, and for environmentally cleaning the gaseous by-products of the heating and curing process.

Attempts have been made in the past to integrate organic binder materials with mineral fibers from a rotary process without merely spraying the veil of fibers with an aqueous solution of the binder material. For example, U.S. Pat. No. 5,123,949 to Thiessen discloses a rotary fiberizing process where additive particles are supplied through the hollow quill or axle of the rotating spinner. The particles are directed toward the veil of mineral fibers from a locus within the veil. The additive particles can be fibrous in nature, such as cellulose fibers, and also can be resinous material in a particulate form.

Another approach in integrating organic material with rotary mineral fibers is disclosed in U.S. Pat. No. 5,614,132 to Bakhshi et al. A glass rotary fiberizer is operated to produce a downwardly moving hollow veil of glass fibers, and a polymer fiberizer is operated within the hollow veil to produce polymer fibers within the veil but directed radially outwardly toward the glass fibers. The polymer fibers commingle with the glass fibers, producing a reinforced resinous product having both glass fibers and polymer fibers. When the process of this patent was operated experimentally to make a glass mat reinforced plastic material, the polymer fibers experienced considerable heat from the hot fiber forming environment, with a typical result being that most of the polymer fibers melted and ended up as non fibrous particles on the glass fibers or on the polymer fibers. See, for example, Column 4, line 66 to Column 5, line 2. This was satisfactory for commingling glass fibers and polymer material into a molding material (a glass mat thermoplastic material) suitable for molding into a dense reinforced plastic product. Due to the nature of the compression of the product in a molding process, there was no need to provide a more substantial retention of polymer in fibrous form with the glass fibers. However, it is believed that the thermal resistance of insulation products would benefit from having a majority or more preferably a substantial amount of the polymer material in fibrous form.

As an alternative to the coaxial rotary commingling process, U.S. Pat. No. 5,595,584 to Loftus et al. discloses an alternate commingling process where glass rotary fiberizers centrifuging glass fibers, and polymer rotary fiberizers centrifuging polymer fibers, are positioned alternately with each other arranged along a collection surface. The polymer fiberizer can be oriented at an angle to the vertical so that the flow of polymer fibers is directed at an angle into contact with the veil of glass fibers. While the purpose of the alternate commingling process was to decouple the polymer fiber forming environment from the glass fiber forming region, it was perceived to be quite difficult to uniformly integrate the rotary-formed polymer fibers into the veil of glass fibers. The nonuniformities of the rotary polymer process combined with the swirling, chaotic environment of the glass fiber forming region would prohibit significant penetration of the polymer fibers into the glass fibers, potentially resulting in an unpredictable, laminar product having less than desired properties for some products.

It would be advantageous if there was developed an improved process for integrating polymer or other organic fibers into a flowing stream of glass fibers to produce a generally uniform mix of glass fibers and polymer fibers, preferably uniform by fiber distribution and uniform by weight. Such a process should provide protection for the polymer material supplied in fibrous form so that the polymer fibers are not subjected to a hot environment which could undesirably vaporize the polymer material or otherwise degrade the polymer material, or which could soften or melt the polymer fibers into non-fibrous particles. Further, such a process would allow flexibility in how the polymer fibers would be integrated with the mineral fibers. Also, ideally, the process would enable polymer fibers of two or more polymeric materials to be integrated with the glass fibers.

SUMMARY OF THE INVENTION

The above objects as well as other objects not specifically enumerated are achieved by a method of making a fibrous pack including centrifuging at least two sets of mineral fibers from molten mineral material using at least two mineral fiber spinners that are arranged in a machine direction along a collection surface, directing each set of mineral fibers into a downwardly moving veil beneath one of the mineral fiber spinners, generating at least one downwardly moving array of aligned organic fibers from at least one orificed die that is spaced from each of the mineral fiber spinners and directing the array into contact with the mineral fibers, and collecting the mineral fibers and organic fibers as a fibrous pack.

According to this invention, there is also provided apparatus for making a fibrous pack including at least two mineral fiber spinners that are arranged in a machine direction along a collection surface for centrifuging at least two sets of mineral fibers from molten mineral material, means for directing each set of mineral fibers into a downwardly moving veil beneath one of the mineral fiber spinners, at least one orificed die that is spaced from each of the mineral fiber spinners for generating a downwardly moving array of aligned organic fibers and directing the array into contact with the mineral fibers, and a collection surface for collecting the mineral fibers and organic fibers as a fibrous pack.

DETAILED DESCRIPTION OF THE INVENTION

This invention will be described using glass fibers as an example of the mineral fibers of the invention. It is to be understood that the invention can be practiced using mineral fibers of other heat-softenable mineral material, such as rock, slag and basalt. Also, although the invention will be described using polymer fibers as the fibers to be directed into contact with the glass fibers, it is to be understood that fibers of any organic material, such as asphalt material, can be used with the invention, as long as the fibers are long or substantially continuous fibers suitable for enhancing the product properties.

Figure 1:
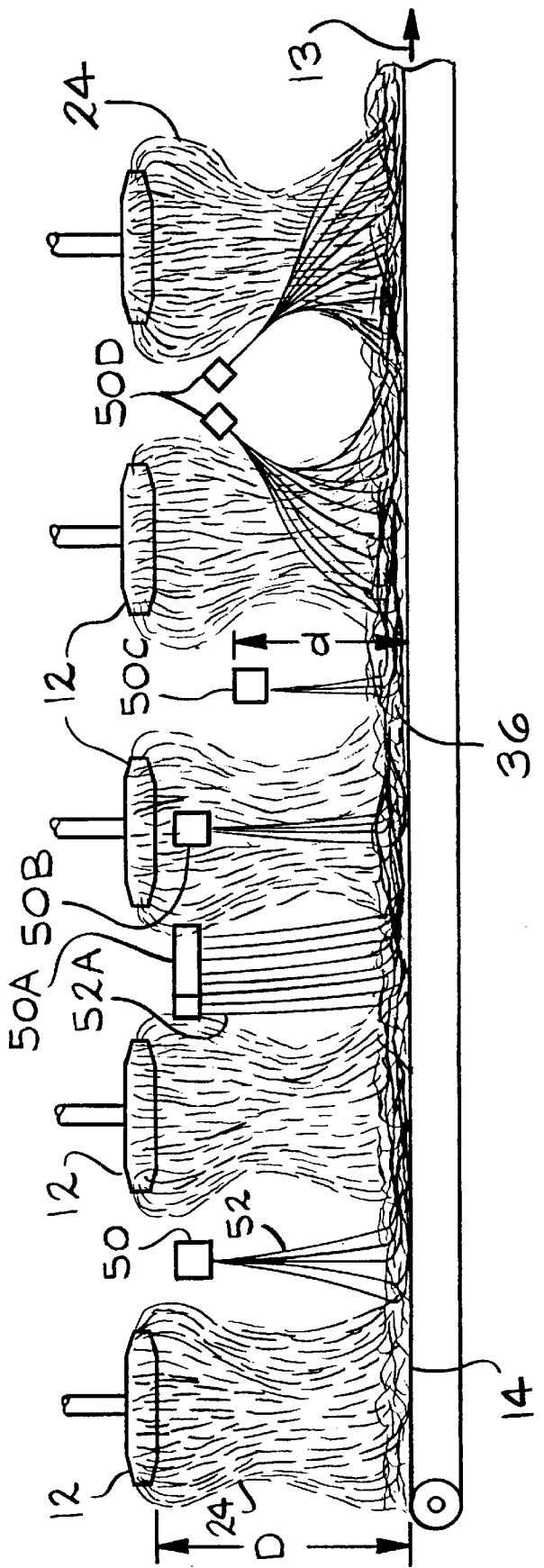
FIG. 1 is a schematic view in elevation of apparatus for integrating polymer fibers with glass fibers according to the method of the invention.
Figure 2:
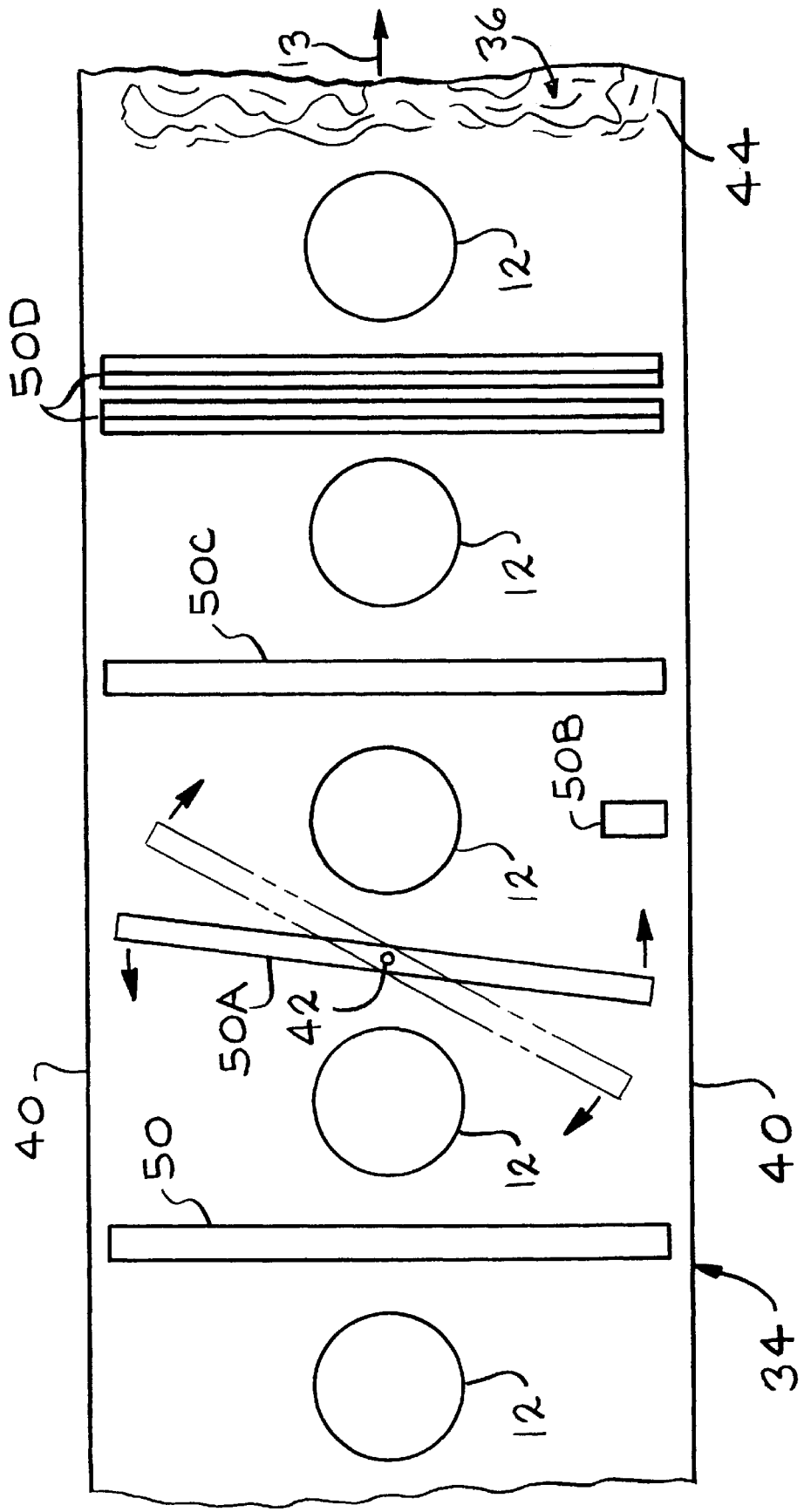
FIG. 2 is a plan view of the apparatus of FIG. 1.

As shown in FIGS. 1 and 2, the apparatus for carrying out the method of the invention includes a plurality of spinners 12, which are arranged generally lengthwise, i.e., along the machine direction as indicated by arrow 13, of a moving fiber collection surface, such as forming chain 14. As shown more clearly in FIG. 3, the spinners are surrounded by an annular blower 16, and are rotated on an axle or quill 18. Optionally, an annular burner, not shown, can be positioned to distribute heat to the spinner and the glass fiber forming environment. A stream 20 of molten glass is delivered from a glass melting furnace, not shown, and the molten stream 20 drops into the interior of the rotating spinner 12. The centrifugal forces of the rotating spinner force the molten glass to emanate from the spinner in the form of fine glass streams that are turned downwardly as glass fibers 22 by the action of the blower 16 and gases induced by the blower. The blower gases and induced air attenuate the glass fibers into their final fine diameter, typically within the range of from about 3 to about 8 microns.

The glass fibers travel in a downwardly moving veil 24, which is generally cylindrical in shape, and which contains not only the glass fibers, but also rapidly moving air from the blower 16. The veil 24 initially has a diameter slightly larger than the diameter of the spinner. The size or diameter of the veil, and the rotational speed of the gases and fibers within the veil, change as the veil moves downwardly. These changes are due to dissipation of the original energy of the gases within the veil, and on external forces influencing the veil. Generally, the veil expands as it moves downwardly in the present invention.

Nozzles, not shown, can optionally be positioned to direct liquid sprays into the veil. Such sprays could include water or other evaporative liquid to cool the fibers and associated gases within the veil. The nozzles could also spray a lubricant onto the fibers to reduce fiber-to-fiber friction in the ultimate insulation product, which could thereby prevent fiber damage. If desired, the nozzles could also be used to add an optional resinous binder to the glass fibers, although the method of the invention should result in a product having integrity and recovery properties good enough that a binder is not needed. Resinous binders, such as a urea phenol formaldehyde, are well known in the art. The nozzles are supplied with the desired liquid by means not shown.

Another device for affecting the veil 24 is an optional set of air lappers, not shown, that can be positioned to distribute the veil 24 in directions transverse to the machine direction 13. The air lappers discharge air to sweep or direct the veil from side to side of the collection chamber or forming hood 34 so that the pack 36 collected on the forming chain 14 will have an even distribution across the width of the forming chain, from one hood wall 40 to the other. The forming chain 14 is mounted for movement as a conveyor, and is foraminous so that a suction box, not shown, positioned beneath the forming chain, can evacuate of gasses from the hood 34 and pack 36.

Figure 3:
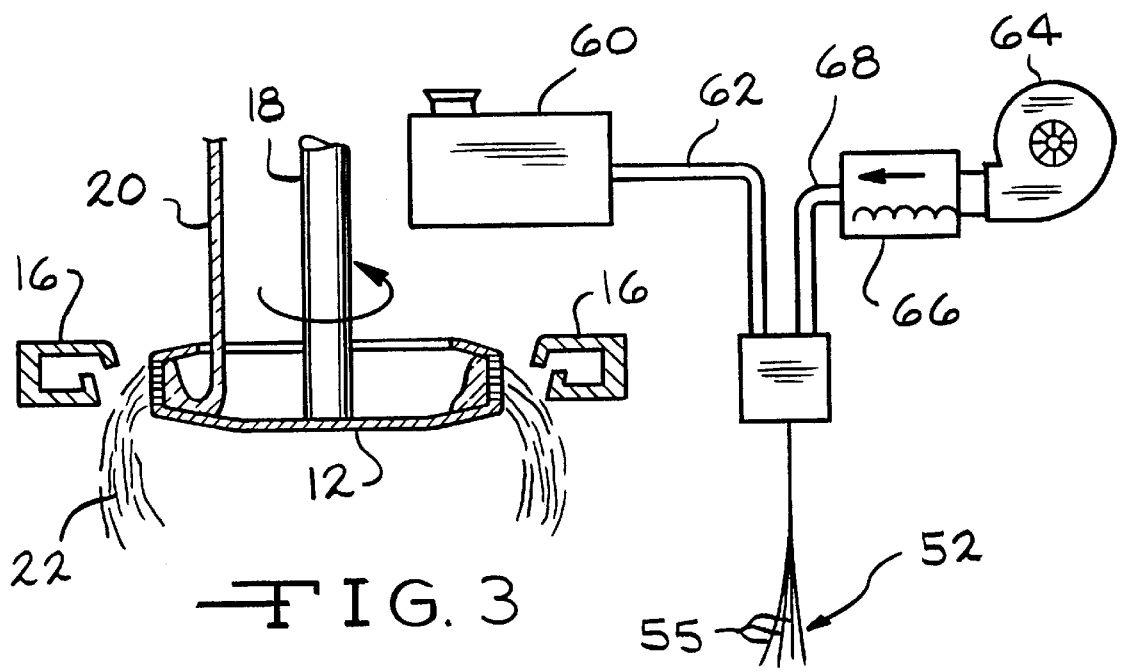
FIG. 3 is a schematic view in elevation illustrating the apparatus of FIG. 1 in greater detail, and particularly illustrating the generation of the polymer fibers.

Positioned within the forming hood 34 are several (two or more) polymer fiber generation devices, preferably polymer fiber dies 50. It is to be understood that the dies 50 can be mounted for adjustability. As shown in FIG. 3, the polymer fiber die 50 produces an array 52 of polymer fibers 55, and directs them into contact with the glass fibers 22 to integrate the polymer fibers 55 with the glass fibers. The velocity of the polymer fibers in the array, in the direction away from the die, is at least 50 meters/second at a distance of 20 cm downstream from the die, and preferably is at least 100 meters/second. The intermingled polymer fibers 55 and glass fibers 22 are collected together in the form of the insulation pack 36.

The polymer fiber die 50 can be any device suitable for forming fibers of polymer material or other organic material capable of forming fibers. A suitable polymer die 50 is a melt blowing die capable of producing generally continuous polymer fibers having an average diameter greater than about 4 microns, and preferably within the range of from about 4 to about 25 microns, and most preferably about 6 microns. Suitable polymer dies are available from J&M Laboratories, Inc., Dawsonville, Ga., and from Biax Fiber-Film Corporation, Neenah, Wis. The polymer die 50 will preferably be selected to be able to provide a polymer content, by weight, within the range of from about 1 to about 10 percent of the expected total throughput of the glass fibers and polymer fibers. For example, if the glass fiber throughput is 1000 pounds per hour (454 kg/hr) and the desired loss on ignition (LOI) of polymer fibers is 2.5 percent, then the polymer die would be configured to have a throughput of about 25.6 pounds per hour (11.7 kg/hr). The LOI is the percentage of the total material that is organic and will burn off when heated.

The polymer fibers 55 can be made of any polymeric material from which fibers of suitable length, strength, durability and insulation characteristics can be formed. It is well known in the melt blowing industry that the fibers from a melt blowing polymer die are produced in substantially continuous lengths. Suitable polymer materials for making the polymer fibers are polyethylene terephthalate (PET) and polypropylene. Other polymer materials potentially useful for making fibers include polyphenylene sulfide (PPS), nylon, polycarbonate, polystyrene and polyamide. Even though the invention is described using polymer fibers 55 as an example, it is to be understood that other materials, including resins, asphalts, and other thermoplastic and thermoset materials, potentially can be used with the present invention. Polypropylene and PET are preferred materials for forming the polymer fibers.

As sown in FIG. 3, associated with the polymer fiber die 50 is a an extruder 60 that supplies polymer material to the polymer fiber die 50 via a polymer line 62. The extruder can be any suitable extruder for heating and pressurizing the organic material and supplying it in a fiberizable form. Suitable extruders are available from the above-mentioned polymer die suppliers.

Also associated with the polymer fiber die 50 is a polymer blower 64 which supplies hot pressurized air to the polymer fiber die for attenuation of the polymer fibers 55. The volume of air required is a function of the desired fiber diameter and the amount of polymer material being fiberized, as well as other factors. The air is heated with the heater 66, which is preferably an electric heater, and the heated air is supplied to the polymer die 50 via hot air line 68. The hot air exits the polymer fiber die 50 to help attenuate the polymer fibers and maintain them in a soft attenuable condition as long as is necessary for satisfactory reduction in diameter. The array 52 of aligned organic fibers is generated by disbursing the molten polymeric material through the orifices of the orificed polymer die 50, and by attenuating the polymeric material with gaseous flows moving away from the die. As with the polymer fiber die 50, the polymer extruder 60, blower 64 and heater 66 are commercially available. The polymer fiber die 50 is preferably provided with insulation material, not shown, to prevent excessive heat loss.

Each die 50 is supplied with molten polymer material by a polymer line, not shown in FIG. 2, and the polymer lines can be fed by a polymer manifold, not shown, and connected to the polymer extruder, not shown in FIG. 2. The polymer dies 50 are also supplied with hot air by hot air lines, not shown in FIG. 2, which can be supplied by hot air manifolds, not shown. The hot air aids in the attenuation of the polymer fibers by maintaining the polymer fibers in a soft, attenuable state during the attenuation process. If the polymer fibers were to cool too quickly after leaving the die 50, the polymer fibers would be too fat. The air supplied to the die is at a volume and pressure sufficient to result in up to nearly sonic air speeds.

As shown in FIG. 2, the polymer fiber die 50 is positioned between and spaced apart from two successive glass fiber spinners. It can be seen that the polymer fiber die 50 extends transverse to the machine direction 13, substantially across the width of the forming chain 14. The downwardly moving array 52 of polymer fibers 55 generated by the polymer fiber die 50 is directed into contact with the glass fibers 22 to integrate the polymer fibers 55 with the glass fibers 22. In some situations the polymer fibers 55 intersect the veil 24 before the glass fibers 22 in the veil reach the forming chain 14, and in other situations the polymer fibers do not significantly contact or mix with the glass fibers until the polymer fibers reach the fibrous pack 36 on the forming chain 14, as shown for the polymer fibers from polymer die 50. Where the polymer fibers are to be directed into the veil 24, a balance must be maintained to assure that the polymer fibers are aimed high enough into the glass fiber veil 24 for good penetration, and yet not so high that the polymer fibers encounter heat sufficient to melt too many of the fibers. It is important to retain a majority of the organic material in fibrous form.

As the polymer fibers 55 move further from the die 50, the paths of the fibers begin to diverge as the array begins to decay. The rate at which the array decays will depend on several factors, including the initial velocity of the polymer fibers, the volume of air flow with the array of fibers, the mass flow rate of the polymer material exiting the die, and the amount of air currents or turbulence surrounding the die. In a typical melt blown die 50 the parallel nature of the array of fibers decays substantially at a distance of about 30 to about 40 cm from the die. As a practical matter, where the polymer fibers 55 are directed into the veil 24 of glass fibers, it is beneficial for the polymer fibers to arrive at the glass fiber veil in a state of relative alignment in order to achieve successful insertion or integration of the polymer fibers into the glass fibers. Typically, the polymer fibers are still in an aligned array at a distance of about 20 cm from the die because a majority of the polymer fibers will still be substantially normal to the bottom of the die 50.

As a variation to the standard polymer die 50, polymer die 50A is positioned between two adjacent spinners 12, and is mounted for rotation about an axis, such as vertical axis 42 to enable the array of aligned polymer fibers to be moved to adjust the distribution of the polymer fibers in the fibrous pack.

As another variation to the standard polymer die 50, a shorter die 50B can be positioned at specific locations, such as one side of the forming hood 34, to distribute polymer fibers 55 into a specific location in the fibrous pack 36. As shown in FIG. 2, the short die 50B is positioned to deposit polymer fibers at the longitudinal edge 44 of the fibrous pack 36.

If it is desired that most or substantially all of the polymer fibers from a particular die are deposited on top of the previously collected pack 36 as a layer of polymer fibers, and are not generally intermingled with the glass fibers, the polymer die, such as polymer die 50C, can be positioned substantially lower than the level of the spinners 12. It can be seen that the rotary glass fiber spinners 12 are positioned at a first distance D from the forming chain 14, and the orificed die 50C is positioned closer to the forming chain 14, at a second distance d from the forming chain. Preferably, the second distance d is less than about 60 percent of the first distance D.

In another variation of the invention, two polymer dies 50D are positioned between adjacent spinners 12. As shown, these two polymer dies 50D can be positioned at angles to the vertical to direct the polymer fibers into the glass fiber veils 24 so that a substantial portion of the polymer fibers will intersect the veil 24 above the forming chain. One of the features of the invention is that by using a multiplicity of dies 50, 50A, 50B, 50C or 50D, a method of making a fibrous pack 36 can include the use of one or more of the orificed dies generating downwardly moving arrays of aligned fibers from a first organic or polymeric material, and one or more of the orificed dies generating downwardly moving arrays of aligned fibers from a second organic or polymeric material.

Figure 4:
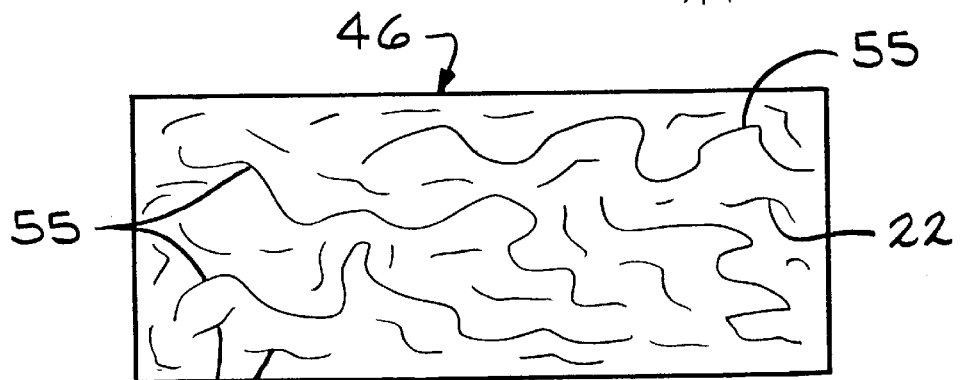
FIG. 4 is schematic side view in elevation of an insulation product made according to this invention, with the polymer fibers generally integrated with the glass fibers.
Figure 5:
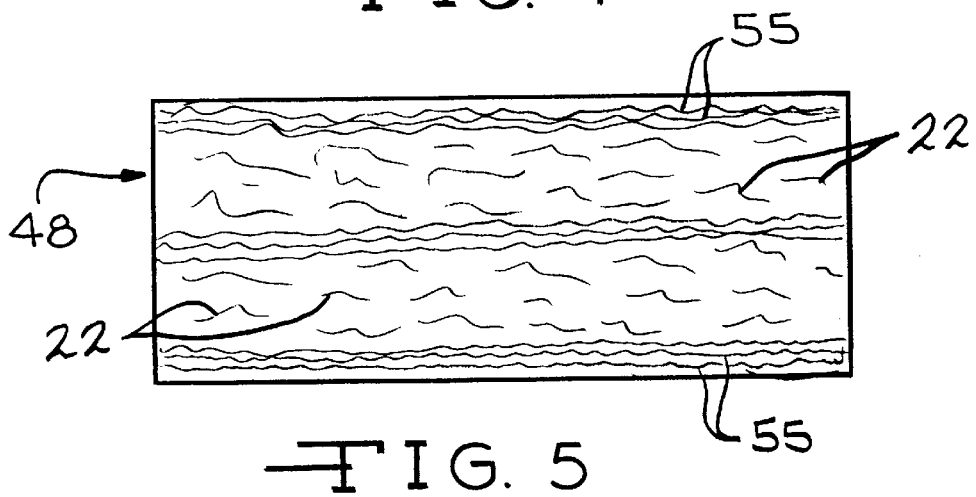
FIG. 5 is schematic side view in elevation of an insulation product made according to this invention, with the polymer fibers generally layered with the glass fibers.

If desired, fibrous pack can be subjected to a downline heat setting oven to soften the polymer fibers to an extent sufficient to bond the polymer fibers to the glass fibers without causing the polymer fibers to lose their fibrous nature. It is important to note that such an oven would be required to be supplied in a conventional process where a binder must be cured. This reduced energy requirement can be a tremendous cost savings. Further, surface layers of polymer fibers on fibrous products could be subjected to a heating process to convert the layer of polymer fibers into a bonded polymeric network for advantageous product qualities. Such a surface layer would make the resulting insulation product stronger and more amenable to handling without damage. Also, the fibrous pack could be subjected to a molding process in which either the whole fibrous pack or the surfaces of the pack could be molded under heat and pressure to form various insulation or structural products.

Where the polymer fibers are directed to intersect with the glass fiber veil 24 above the forming chain 14, as shown by the two dies 50D in FIG. 1, the polymer fibers 55 will be integrated with the glass fibers 22. The resulting integrated insulation product 46 is illustrated in FIG. 4. Where the polymer fibers are directed not to intersect with the glass fiber veil 24 above the forming chain 14, but rather to be deposited on the previously formed material as shown by the dies 50C in FIG. 1, the polymer fibers 55 will be layered with the glass fibers 22 in the fibrous pack 36. The resulting layered insulation product 48 is illustrated in FIG. 5. Layers of polymer fibers 55 alternate vertically with layers of glass fibers 22.

It can be seen by the above discussion that various combinations of one or more polymer dies 50, 50A, 501B, 50C, and 50D can be used to effect different product attributes in insulation products produced according to the method of the invention. The capability and flexibility of the method of the invention will enable the manufacture of improved products, having better weight distribution and better fiber distribution without the need for auxiliary distribution or lapping devices for the polymer fibers. Further, there is an improved control of the nature of the polymer fiber/glass fiber interface, including the degree of entanglement between the polymer fibers and the glass fibers. Additionally, the introduction of relatively long and strong polymer fibers into the predominantly glass fiber pack provides several significant advantages. First it makes the pack more suitable for a needling process, which will enable the production of insulation products without traditional binders. Second, it advantageously provides greatly increased mechanical and tensile strength, thereby allowing the insulation products to exhibit improved handleability. For example, binderless wall cavity insulation products, capable of being picked up and held by holding one end, can be made using the method of the invention. Finally, the polymer fibers are lighter than glass, and on a weight basis provide an increased surface area vis-à-vis glass fibers, thereby contributing to improved thermal and acoustical performance.

The principle and mode of operation of this invention have been described in its preferred embodiment. However, it should be noted that this invention may be practiced otherwise than as specifically illustrated and described without departing from the scope of the invention.

What is claimed is:

1. A method of making a fibrous pack comprising:

centrifuging at least two sets of mineral fibers from molten mineral material using at least two mineral fiber spinners that are arranged in a machine direction along a collection surface;

directing each set of mineral fibers into a downwardly moving veil beneath one of the mineral fiber spinners;

generating a downwardly moving array of aligned organic fibers from at least one melt blowing die that is spaced from each of the mineral fiber spinners, and directing the array into contact with the mineral fibers; and collecting the mineral fibers and organic fibers as a fibrous pack.

2. The method of claim 1 in which said generating and directing step includes directing a substantial portion of the array to intersect the veil above the collection surface to integrate the organic fibers with the mineral fibers.

3. The method of claim 2 in which the velocity of the organic fibers in the array is at least 50 meters/second at a distance of 20 cm downstream from the dies.

4. The method of claim 2 in which the velocity of the organic fibers in the array is at least 100 meters/second at a distance of 20 cm downstream from the dies.

5. The method of claim 1 in which said generating and directing step includes generating an array of aligned organic fibers by disbursing molten organic material through orifices of the melt blowing die, and by attenuating the organic material with a gaseous flow moving away from the die.

6. The method of claim 1 in which said generating and directing step includes directing a substantial portion of the array to intersect the glass fibers on the collection surface.

7. The method of claim 1 in which said generating and directing step includes generating and directing at least one array from at least one melt blowing die from a first organic material, and at least one array from at least one melt blowing die from a second organic material.

8. The method of claim 1 in which said generating and directing step includes generating and directing the array from a melt blowing die extending transverse to the machine direction, substantially across the width of the collection surface.

9. The method of claim 1 wherein the generating and directing step includes generating and directing at least two arrays from at least two melt blowing dies positioned between the mineral fiber spinners.

10. The method of claim 1 in which the mineral fiber spinners are positioned at a first distance from the collection surface, and the melt blowing die is positioned at a second distance from the collection surface, which second distance is less than about 60 percent of the first distance.

11. The method of claim 1 further including rotating the melt blowing die about an axis to adjust the distribution of the organic fibers in the fibrous pack.

12. The method of claim 1 wherein the fibrous pack has a longitudinal edge, and wherein the generating and directing step includes directing the array into contact with the mineral fibers along the longitudinal edge of the fibrous pack.

13. Apparatus for making a fibrous pack comprising:
- at least two mineral fiber spinners that are arranged in a machine direction along a collection surface for centrifuging at least two sets of mineral fibers from molten mineral material;
- means for directing each set of mineral fibers into a downwardly moving veil beneath one of the mineral fiber spinners;
- at least one melt blowing die that is spaced from each of the mineral fiber spinners for generating a downwardly moving array of aligned organic fibers and directing the array into contact with the mineral fibers; and
- a collection surface for collecting the mineral fibers and organic fibers as a fibrous pack.

14. The apparatus of claim 13 in which said means for directing each set of mineral fibers is an annular blower surrounding each mineral fiber spinner.

15. The apparatus of claim 13 in which said at least one melt blowing die is positioned to direct a substantial portion of the array to intersect the veil above the collection surface to integrate the organic fibers with the mineral fibers.

16. The apparatus of claim 13 in which said at least one melt blowing die is positioned to direct a substantial portion of the array to intersect the mineral fibers on the collection surface to integrate the organic fibers with the mineral fibers.

17. The apparatus of claim 13 in which said at least one melt blowing die includes at least one melt blowing die for generating and directing an array from a first organic material, and at least one melt blowing die for generating and directing an array from a second organic material.

18. The apparatus of claim 13 in which said melt blowing die extends transverse to the machine direction, substantially across the width of the collection surface.

19. The apparatus of claim 13 in which said at lest one melt blowing die includes at least two melt blowing positioned between the mineral fiber spinners.

20. The apparatus of claim 13 in which the mineral fiber spinners are positioned at a first distance from the collection surface, and the melt blowing die is positioned at a second distance from the collection surface, which second distance is less than about 60 percent of the first distance.

21. The apparatus of claim 13 wherein said at least one melt blowing die is mounted for rotation about an axis to adjust the distribution of the organic fibers in the fibrous pack.

22. The apparatus of claim 13 wherein said at least one melt blowing die is mounted to direct the array into contact with the mineral fibers along a longitudinal edge of the fibrous pack.

* * * * *